US007277929B2

(12) United States Patent
Ohara

(10) Patent No.: US 7,277,929 B2
(45) Date of Patent: Oct. 2, 2007

(54) NETWORK SYSTEM INCLUDING A NETWORK DEVICE HAVING A FUNCTION-CATEGORIZED WEB PAGE DELIVERING SYSTEM

(75) Inventor: Kiyotaka Ohara, Aichi-ken (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 815 days.

(21) Appl. No.: 10/300,024

(22) Filed: Nov. 20, 2002

(65) Prior Publication Data
US 2003/0101236 A1    May 29, 2003

(30) Foreign Application Priority Data
Nov. 20, 2001 (JP) ............................. 2001-354593

(51) Int. Cl.
*G06F 15/16* (2006.01)
(52) U.S. Cl. .................... 709/219; 709/229; 709/217
(58) Field of Classification Search ............... 709/245, 709/218, 220, 219, 217, 229; 710/8; 345/744; 715/501.1, 513
See application file for complete search history.

(56) References Cited

U.S. PATENT DOCUMENTS

| 5,276,440 | A | | 1/1994 | Jolissaint et al. | |
| 5,974,234 | A | * | 10/1999 | Levine et al. | 358/1.16 |
| 6,020,973 | A | | 2/2000 | Levine et al. | |
| 6,067,558 | A | * | 5/2000 | Wendt et al. | 709/202 |
| 6,490,052 | B1 | * | 12/2002 | Yanagidaira | 358/1.15 |
| 6,983,415 | B2 | * | 1/2006 | Shima | 715/501.1 |
| 2001/0052995 | A1 | | 12/2001 | Idehara | |
| 2002/0078183 | A1 | * | 6/2002 | Helms | 709/220 |
| 2002/0188759 | A1 | * | 12/2002 | Roy et al. | 709/245 |
| 2003/0030664 | A1 | * | 2/2003 | Parry | 345/744 |

FOREIGN PATENT DOCUMENTS

| EP | 0 843 268 A2 | 5/1998 |
| EP | 0 867 799 A2 | 9/1998 |
| EP | 0 896 454 A2 | 2/1999 |
| EP | 0 963 076 A2 | 12/1999 |
| EP | 0 991 227 A2 | 4/2000 |
| EP | 1 143 695 A2 | 10/2001 |
| JP | A 10-320341 | 12/1998 |
| JP | A 11-203087 | 7/1999 |
| JP | A 2000-99136 | 4/2000 |
| JP | A 2000-148632 | 5/2000 |
| JP | A 2000-259545 | 9/2000 |

* cited by examiner

*Primary Examiner*—Rupal Dharia
*Assistant Examiner*—Djenane Bayard
(74) *Attorney, Agent, or Firm*—Oliff & Berridge, PLC

(57) ABSTRACT

In network system includes a plurality of network devices interconnected with each other through a network, one or more network devices including a first network device have a plurality of functions. The network devices can deliver function-categorized web pages respectively corresponding to one or more functions. A second network device requests the one or more network devices for the location data which is necessary for accessing the function-categorized web pages corresponding to a user-designated function. The one or more network devices transmits the location data of the function-categorized web page, which each network device can deliver, corresponding to the user-designated function to the second network device in response to the request. The second network device collects the transmitted location data, and creates an access web page based on the collected location data. The access web page includes hyperlinks to the function-categorized web pages corresponding to the user-designated function.

19 Claims, 8 Drawing Sheets

| FUNCTION ID | PATH |
|---|---|
| PRINTER | /printer/control/main.html |
| SCANNER | /scanner/control/main.html |

| DEVICE NAME | IP ADDRESS | DEVICE TYPE NAME |
|---|---|---|
| TOM's MFP | 10.134.43.28 | xxxx yyy1 |

FIG.4A

| OBJECT | OBJECT ID | PARAMETERS |
|---|---|---|
| PrinterControlUrl | 1.3.6.1.4.1.2435.2.3.9.4.9.9.2 | http://10.134.43.87:5431/printer/control/main.html |
| ScannerControlUrl | 1.3.6.1.4.1.2435.2.3.9.4.9.9.1 | http://10.134.43.87:5431/scanner/control/main.html |
| sysName | 1.3.6.1.2.1.1.5.0 | Bill's MFP |
| hrDeviceDescr | 1.3.6.1.2.1.25.3.2.1.3.1 | xxxx yyy2 |
| ipAddress | 1.3.6.1.4.1.2435.2.3.1.4.2.1 | 10.134.43.87 |

FIG.4B

| OBJECT | OBJECT ID | PARAMETERS |
|---|---|---|
| ScannerControlUrl | 1.3.6.1.4.1.2435.2.3.9.4.9.9.1 | http://10.134.32.16:5431/scanner/control/main.html |
| sysName | 1.3.6.1.2.1.1.5.0 | TOM's Scanner |
| hrDeviceDescr | 1.3.6.1.2.1.25.3.2.1.3.1 | xxxx yyy3 |
| ipAddress | 1.3.6.1.4.1.2435.2.3.1.4.2.1 | 10.134.32.16 |

FIG.6A

| MAME | IP ADDRESS | MACHINE NAME | URL |
|---|---|---|---|
| Bill's MFP | 10.134.43.87 | xxxx yyy2 | http://10.134.43.87:5431/scanner/control/main.html |
| Tom's Scanner | 10.134.32.16 | xxxx yyy3 | http://10.134.32.16:5431/scanner/control/main.html |
| Tom's MFP | 10.134.43.28 | xxxx yyy1 | /scanner/control/main.html |

FIG.6B

| MAME | IP ADDRESS | MACHINE NAME | URL |
|---|---|---|---|
| Bill's MFP | 10.134.43.87 | xxxx yyy2 | http://10.134.43.87:5431/printer/control/main.html |
| Tom's MFP | 10.134.43.28 | xxxx yyy1 | /printer/control/main.html |

FIG.6C

| MAME | IP ADDRESS | MACHINE NAME | URL |
|---|---|---|---|
| Bill's MFP | 10.134.43.87 | xxxx yyy2 | http://10.134.43.87:5431/scanner/control/main.html |
| Bill's MFP | 10.134.43.87 | xxxx yyy2 | http://10.134.43.87:5431/printer/control/main.html |
| Tom's Scanner | 10.134.32.16 | xxxx yyy3 | http://10.134.32.16:5431/scanner/control/main.html |
| Tom's MFP | 10.134.43.28 | xxxx yyy1 | /scanner/control/main.html |
| Tom's MFP | 10.134.43.28 | xxxx yyy1 | /printer/control/main.html |

NETWORK SYSTEM INCLUDING A NETWORK DEVICE HAVING A FUNCTION-CATEGORIZED WEB PAGE DELIVERING SYSTEM

BACKGROUND OF THE INVENTION

The present invention relates to a network system such as a LAN (Local Area Network) system.

Recently, printers, image scanners, facsimile machines, MFPs (Multi-Function Peripherals) and the like are often configured as network devices, which are interconnected with each other through a network system (e.g., LAN). Such network devices generally installed with a web server function, and configured to deliver web pages.

The web pages delivered through the network devices as above sometimes include pages indicating functions of the network devices. There are cases where functional settings of the network devices are made through the network and/or operation of the network devices is controlled through the network. Web pages allowing such indication, settings and/or control will be referred to as function-categorized web pages hereinafter. Further, there are top pages in which hyperlinks to such function-categorized web pages.

In such network devices, when a plurality of network devices are connected to the network, a device capable of searching for other network devices, and creating an access web page indicating hyperlinks linking to top pages which can be delivered by the detected network devices may be used. With use of such hyperlinks in the thus created access web page, top pages delivered by the other network devices can be accessed easily. Therefore, when a plurality of network devices are used one after another, for example, operability is well improved by such an access page.

The access pages described above only allows access to top pages delivered by respective network devices. Therefore, a user is required to thread from the top page to a function-categorized web page through some intermediate pages.

Further, according to the conventional network device, it is only possible to search for other network devices connected to the network, and the functions of respective network devices are not taken into account. Therefore, according to the conventional network device, a function web page indicating hyperlinks corresponding to a predetermined function cannot be automatically created. Accordingly, for example, although a user intends to use a printer, it may happen that the user mistakenly accesses to a top page delivered by an image scanner.

As such, in the conventionally provided access web pages, extra operations are required to reach the function-categorized web page which has a function the user wishes to use, or corresponding to the function user intends to use, and is relatively difficult or troublesome to access the target web page.

SUMMARY OF THE INVENTION

The present invention is advantageous in that a network system and device are provided, with which it becomes possible to access a target web page more easily than in the conventional system and device. The present invention also provides a method of creating a web page. The method may be optionally provided in the form of programs executed by a CPU of a computer.

According to an aspect of the invention, there is provided a network system that includes a plurality of network devices interconnected with each other through a network, the plurality of network devices including at least a first network device and a second network device, one or more network devices including at least the first network device having a plurality of functions. The one or more network devices including at least the first device has a function-categorized web page delivering system that delivers function-categorized web pages respectively corresponding to one or more functions, among the plurality of functions, realized by the one or more network devices. The function-categorized web pages will be displayed by network devices that are configured to display such pages. The second network device includes a location data collecting system that collects location data necessary for accessing the function-categorized web pages corresponding to one of the functions designated by a user from among the one or more network devices including the first network device, an access web page creating system that creates hyperlinks to the function-categorized web pages corresponding to the function designated by the user based on the location data collected by the location data collecting system, and a location data requesting system that requests the one or more network devices for location data corresponding to the function designated by the user. The one or more network devices including the first network device comprises a location data transmitting system that transmits the location data of the function-categorized web page, which each of the one or more network devices can deliver, corresponding to the function designated by the user to the second network device in response to a request by the second network device. The location data collecting system receives the location data transmitted by the one or more network devices including the first network device.

The plurality of network devices may include single-function device or multi-function device. The functions may include a printer function, a scanner function, a facsimile function, a copier function and the like.

As described above, the location data requesting system requests the one or more network devices for the location data. The location data is data identifying the location of the function-categorized web pages. Examples of the location data are URL, a part of URL (e.g., IP address or path name), and the like.

With above-described configuration, it is possible to directly jump from the access web page to a desired function-categorized web page. It is no necessary to follow a chain of the intervening pages as in the conventional system.

Further, the function-categorized wave page is created such that only the location data corresponding to the function designated by the user is referred to. Therefore, the function-categorized web page does not include hyperlinks to a web page corresponding to the function which is not designated by the user. In other words, whichever one of the hyperlinks on the function-categorized web page is used, the user can access the device that has the designated function.

Therefore, according to the above-described network system, the user can access the function-categorized web page corresponding to the intended function, or the network device having the intended function relatively easily.

According to another aspect of the invention, there is provided a network system including a plurality of network devices interconnected with each other through a network, the plurality of network devices including at least a first network device and a second network device, one or more network devices including at least the first network device having a plurality of functions. The one or more network devices including at least the first device comprise a function-categorized web page delivering system that delivers function-categorized web pages respectively corresponding to one or more functions, among the plurality of functions, realized by the one or more network devices. The function-categorized web pages may be displayed by network devices that are configured to display such web pages. The second network device includes a location data collecting system that collects location data necessary for accessing the function-categorized web pages corresponding to one of the functions designated by a user from among the one or more network devices including the first network device, an access web page creating system that creates hyperlinks to the function-categorized web pages corresponding to the function designated by the user based on the location data collected by the location data collecting system, and a location data requesting system that request the one or more network devices for location data of all the function-categorized web pages which can be delivered by the one or more network devices.

The one or more network devices including the first network device has a location data transmitting system that transmits the location data of the function-categorized web pages, which the one or more network devices can deliver, to the second network device in response to a request by the second network device. The location data collecting system receives the location data transmitted by the one or more network devices including the first network device. In this case, the location data collecting system extracting only the location data of the function-categorized web page corresponding to a function designated by a user.

In the above-described network system, from among the location data transmitted from the one or more network devices, data related to the function-categorized web pages corresponding to the user-designated function is extracted, and the access web page is created based on the thus extracted location data. Therefore, the access web page only includes hyperlinks to the function-categorized web pages corresponding to the user-designated function.

In the above network systems, the access web page corresponding to the user-designated function is created. A method of designating the function by user is not limited to a particular method. For example, an input device such as a keyboard or input buttons may be connected to the second network device. Alternatively or optionally, if the second network device is configured to function as a web server, the designation of the function may be done by delivering a web page through which a user may select the function.

In a particular case, the plurality of network devices may be configured to include a client device allowing an input operation of a user and capable of displaying a web page. In this case, the second network device includes a function selecting web page delivering system that delivers a function selecting web page to the client device, the function selecting web page allowing the user of the client device to select one or more functions from among the plurality of functions therethrough, a reply data receiving system that receives reply data transmitted from the client device, the reply data being transmitted by the client to the second network device when the user of the client device performs an operation to select one or more functions with reference to the function selecting web page delivered by the function selecting web page delivering system, a designated function identifying system that identifies the designated function, which is designated by the user, in accordance with the data received by the reply data receiving system, and an access web page delivering system that transmits the access web page to the client device when the location data collecting system and the access web creating system create the access web page based on the designated function identified by the designated function identifying system.

With this configuration, any network device through which the user can designate a function and browse a web page, the user can access the intended network device or the function-categorized web page therefor.

Optionally, the second network device may include an access web page displaying system that displays the access web page created by the access web page creating system.

According to another aspect of the invention, there is provided a method of creating a web page for a network system including a plurality of network devices interconnected with each other through a network, the plurality of network devices including at least a first network device and a second network device, one or more network devices including at least the first network device having a plurality of functions. The one or more network devices including at least the first device has a function-categorized web page delivering system that delivers function-categorized web pages respectively corresponding to one or more functions, among the plurality of functions, realized by the one or more network devices. The function-categorized web pages may be displayed by network devices configured to display such web pages. The second network device executes a method that includes (a) requesting the one or more network devices for location data of a function-categorized web page corresponding to a function designated by a user, (b) receiving the location data that is transmitted from the one or more network devices including the first network device in reply to the requesting, and (c) creating an access web page including hyperlinks to the function-categorized web pages corresponding to the function designated by the user based on the received location data.

According to further aspect of the invention, there is provided a method of creating a web page for a network system including a plurality of network devices interconnected with each other through a network, the plurality of network devices including at least a first network device and a second network device, one or more network devices including at least the first network device having a plurality of functions. The one or more network devices including at least the first device comprise a function-categorized web page delivering system that delivers function-categorized web pages respectively corresponding to one or more functions, among the plurality of functions, realized by the one or more network devices. The function-categorized web pages being displayed by network devices configured to display the function-categorized web pages. The second network device executes a method that includes (a) requesting the one or more network devices for location data of all the function-categorized web pages which can be delivered by the one or more network devices, (b) receiving the location data that is transmitted from the one or more network devices including the first network device in reply to the requesting, extracting only the location data of the function-categorized web page corresponding to a function designated by a user, and (c) creating an access web page including hyperlinks to the function-categorized web pages corresponding to the function designated by the user based on the extracted location data.

Still optionally, there is provided a method of transmitting data in a network system including a plurality of network devices interconnected with each other through a network, the plurality of network devices including at least a first network device and a second network device, one or more network devices including at least the first network device having a plurality of functions. The one or more network devices including at least the first device comprise a function-categorized web page delivering system that delivers function-categorized web pages respectively corresponding to one or more functions, among the plurality of functions, realized by the one or more network devices. The function-categorized web pages may be displayed by network devices configured to display such web pages. The second network device includes a location data requesting system that request the one or more network devices for location data corresponding to the function designated by the user, a location data collecting system that collects location data necessary for accessing the function-categorized web pages corresponding to one of the functions designated by a user from among the one or more network devices including the first network device, and an access web page creating system that creates hyperlinks to the function-categorized web pages corresponding to the function designated by the user based on the location data collected by the location data collecting system. One of the one or more network devices including the first network device, which executes the method including transmitting the location data of the function-categorized web page corresponding to the function designated by the user to the second network device in response to a request by the second network device.

Further, there is provided a method of transmitting data in a network system including a plurality of network devices interconnected with each other through a network, the plurality of network devices including at least a first network device and a second network device, one or more network devices including at least the first network device having a plurality of functions. The one or more network devices including at least the first device comprise a function-categorized web page delivering system that delivers function-categorized web pages respectively corresponding to one or more functions, among the plurality of functions, realized by the one or more network devices. The function-categorized web pages may be displayed by network devices configured to display such web pages. The second network device includes a location data requesting system that request the one or more network devices for location data corresponding to the function designated by the user, a location data collecting system that collects location data necessary for accessing the function-categorized web pages corresponding to one of the functions designated by a user from among the one or more network devices including the first network device, and an access web page creating system that creates hyperlinks to the function-categorized web pages corresponding to the function designated by the user based on the location data collected by the location data collecting system. At least one of the one or more network devices including the first network device executes the method which includes transmitting the location data of the function-categorized web page corresponding to the function designated by the user to the second network device in response to a request by the second network device.

According to another aspect of the invention, there is provided a network system including a plurality of network devices interconnected with each other through a network, the plurality of network devices including at least a first network device and a second network device, the first network device having one or more functions, wherein each of the first network devices comprises a function-categorized web page delivering system that delivers function-categorized web pages respectively corresponding to the one or more functions, the first network device storing location data indicative of a location of each of the function-categorized web pages, and a location data transmitting system capable of transmitting the location data of the function-categorized web pages in accordance with a request for location data to the second network device. The second network device may include a location data requesting system that requests the first network devices for location data corresponding to a predetermined function, a location data collecting system that collects location data from the first network devices, and an access web page creating system that creates hyperlinks to the function-categorized web pages corresponding to the function designated through the location data requesting system. The location data collecting system receives the location data transmitted from the second network device, and the second network device displaying the function-categorized web page.

optionally, the second network device may include a peripheral device having a plurality of functions in combination with a predetermined network device connectable to the peripheral device through the network, the predetermined network device having a display device, the function-categorized web page being transmitted from the peripheral device to the predetermined network device and displayed on the display device of the predetermined network device.

Further, the second device may have a web page indicating settings and/or status of functions thereof, the access web page being included in the web page.

Still optionally, the second device has a function of a printer or other peripheral devices.

According to a furthermore aspect of the invention, there is provided a method of creating a web page employed in a network system including a plurality of network devices interconnected with each other through a network, the plurality of network devices including at least a first network device and a second network device, one or more network devices including at least the first network device having a plurality of functions. The first network device is provided with a function-categorized web page delivering system that delivers function-categorized web pages respectively corresponding to one or more functions, among the plurality of functions of the first network device, the first network device storing location data indicative of a location of each of the function-categorized web pages, and a location data transmitting system capable of transmitting the location data of one of the function-categorized web pages in accordance with a request for location data to the second device. The second device executes a method, which includes the steps of requesting the first network devices for location data corresponding to a predetermined function, collecting location data from the first network devices, creating hyperlinks to the function-categorized web pages corresponding to the function designated with the location data requesting system, and displaying a function-categorized web page which is linked from access web page.

optionally, the second device may include a peripheral device having a plurality of functions in combination with a predetermined network device connectable to the peripheral device through the network, the predetermined network device having a display device, the function-categorized web page being transmitted from the peripheral device to the predetermined network device and displayed on the display device of the predetermined network device.

Further optionally, the second device has a web page indicating settings and/or status of functions thereof, the access web page being included in the web page.

The device and method described above and/or according to the present invention can be realized when appropriate programs provided and executed by a personal computer or the like. Such programs may be stored in recording medium such as a flexible disk, CD-ROM, memory cards and the like and distributed. Alternatively or optionally, such programs can be distributed through networks such as the Internet.

BRIEF DESCRIPTION OF THE ACCOMPANYING DRAWINGS

FIG. 4A shows an exemplary table of an MFP which is an object of an MIB;

FIG. 4B shows an exemplary table of an image scanner which is an object of an MIB;

FIG. 6A is a table of parameters used in a data collecting procedure for an image scanner;

FIG. 6B is a table of parameters used in a data collecting procedure for a printer;

FIG. 6C is a table of parameters used in a data collecting procedure for all services;

DETAILED DESCRIPTION OF THE EMBODIMENT

Hereinafter, an embodiment of the invention will be described with reference to the accompanying drawings.

Overall Configuration

Figure 1:
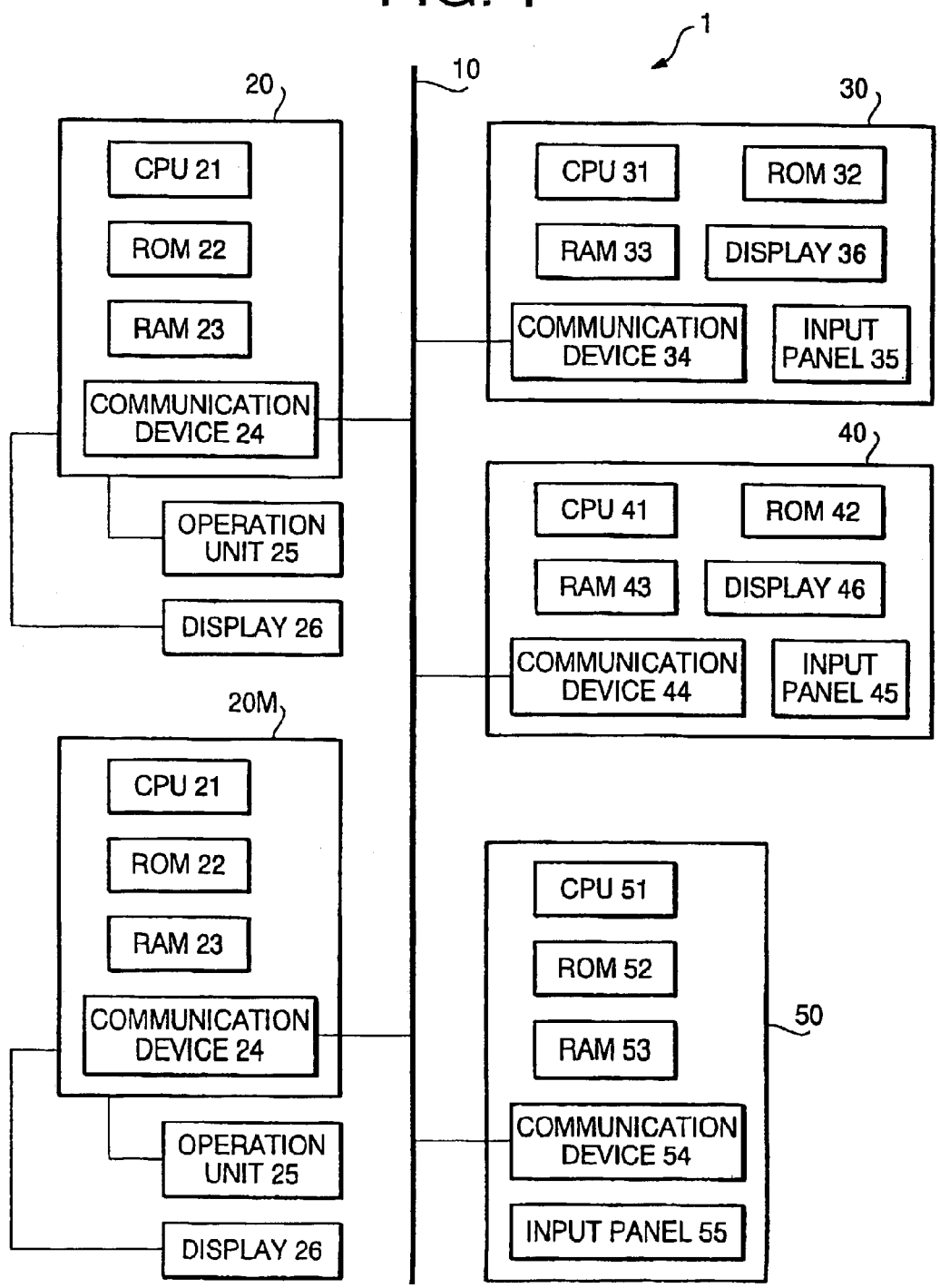
FIG. 1 is a block diagram showing a configuration of a network system according to a first embodiment of the invention.

FIG. 1 is a block diagram showing an overall configuration of a network system 1 according to an embodiment of the present invention.

The network system 1 includes a plurality of network devices interconnected with each other through a network 10 (e.g., a LAN: Local Area Network). The network devices communicate with each other in accordance with a communication protocol of TCP/IP. The network devices include, as shown in FIG. 1, a personal computer (hereinafter referred to as PC) 20, PC 20M, a first MFP (Multi-Function Peripheral) 30, a second MFP 40 and an image scanner 50. For the sake of simplicity, only one PC 20 is shown in FIG. 1, although a plurality of PC 20 are connected to the network system 11.

The PC 20 is a device operated by a user. The PC 20 includes a CPU 21 which controls the entire operation of the PC 20, a ROM 22 storing programs to be executed by the CPU 21, and a RAM 23 temporarily storing operation results of the CPU 21 and the like. The PC 20 further includes a communication device 24 through which the PC 20 is connected with the network 10. The PC 20 further includes an operation unit 25 such as a mouse and a keyboard interfacing the input by the user, and a display 26.

The PC 20 is installed with a web browser. The web browser transmits, in accordance with an HTTP protocol (Hyper Text Transfer Protocol), an HTTP request command for asking a web server to deliver a web page, and for receiving a web page transmitted from the web server that received the transmitted request command. The HTTP request command contains a path name of the web page to be delivered.

The PC 20M has the same structure as the PC 20. The PC 20M is also installed with a web browser. The PC 20M is capable of transmitting the HTTP request command to a web server, and receiving a web page which is transmitted from the web server in response to the HTTP request command.

According to the embodiment, the first MFP 30 is a device having functions of a printer and an image scanner (hereinafter referred to as a printer function and scanner function, respectively). The first MFP 30 includes a CPU 31 which control the entire operation of the MFP 30, a ROM 30 storing programs to be executed by the CPU 31, a RAM 33 temporarily storing operation results of the CPU 31 and the like, a communication device 34 through which the first MFP 30 is connected to the network 10, an input panel 35 interfaces user's input, and a display 36.

In particular, the first MFP 30 is installed with application software that makes the first MFP 30 operate as a web server. By the web server function, the first MFP 30 receives the HTTP request command transmitted through the network 10 (e.g., by the PC 20), retrieves the web page, which is stored in the ROM 32 and identified by the path name contained in the HTTP request command, and delivers the retrieved web page to the sender (e.g., the PC 20) of the HTTP request command. The web pages the first MFP 30 is capable of delivering include:

a printer function page (path:/printer/control/main.html) that is referred to when a printer function setting is performed through the network 10;

a scanner function page (path:/scanner/control/main.html) that is referred to when function and operation of the scanner are set through the network 10;

a device searching page (path:/findpage/main.html); and a top page (path:/index.html) which is a page describing hyperlinks to be selected by the user, and delivers web pages corresponding to the selected hyper link.

The device searching page indicates, as selectable items;

ALL SERVICES corresponding to all functions (i.e., printer and scanner functions);

A PRINTER SERVICE corresponding to the printer function; and

Figures 2, 3A, 3B:
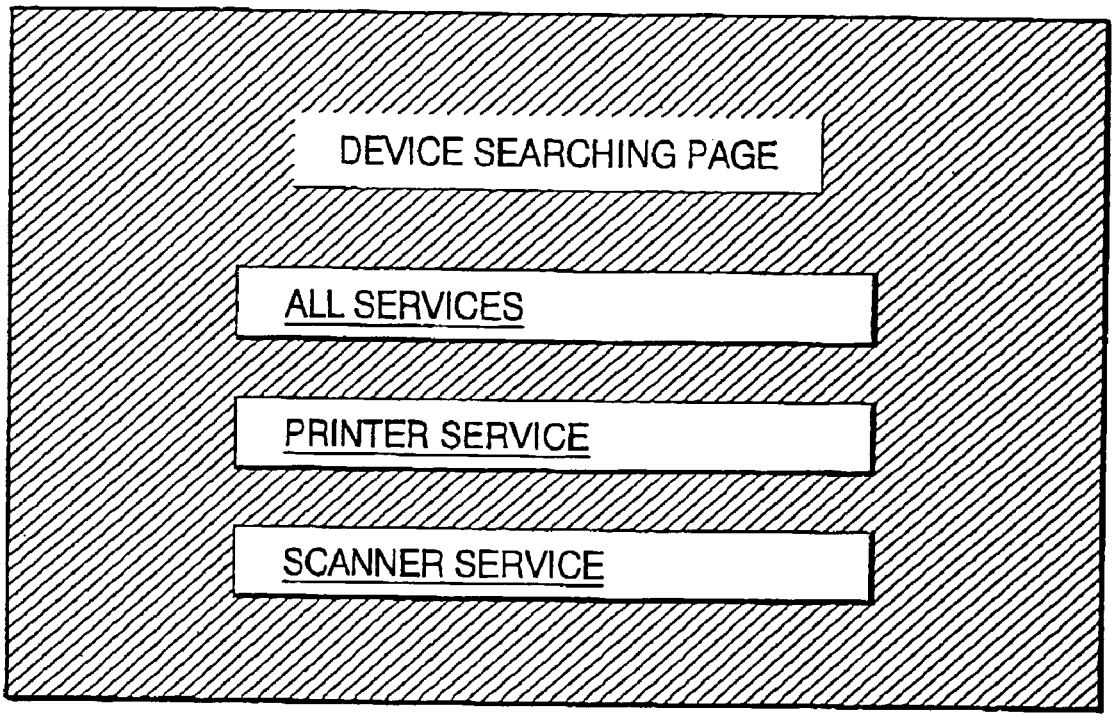
FIG. 2 is an example of a "device searching page" displayed on a personal computer.
FIG. 3A shows an exemplary function table.
FIG. 3B shows an exemplary device table.

A SCANNER SERVICE corresponding to the scanner function (see FIG. 2). The selectable items are hyperlinks to an access web page for the all services (path:/findpage/ allservice), an access web page for printers (path:/findpage/printer) and an access web page for scanners (path:/ findpage/scanner), respectively. The access pages are not stored in the ROM 32, but are generated and delivered by a web page delivering procedure (which will be described later) in response to receipt of the HTTP request.

In the first MFP 30, application software for controlling the first MFP 30 to function as an SNMP (Simple Network Management Protocol) manager is installed. With the SNMP manager function, the first MFP 30 transmits an SNMP request command to other devices, and receives SNMP reply commands which are transmitted from the devices, which received the SNMP request command. It should be noted that an SNMP request packet is for requesting parameters that are set to objects constituting a data base (Management Information Base, which will be referred to as MIB hereinafter) of a device functioning as an SNMP agent. To each of the objects constituting the MIB, an object ID (hereinafter referred to as an OID) is assigned, and parameters are requested based on the OID.

In the ROM 32 of the first MFP 30, function IDs respectively assigned to functions of the first MFP 30, and function tables consisting of path names of web pages corresponding to the functions of the MFP 30 (see FIG. 3A) are stored. As a function ID of the printer function, "printer" is assigned, and is related to a path name "/printer/control/main.html" which is a path name of the printer function page. As a scanner ID of the scanner function, "scanner" is assigned, and is related to a path name "/scanner/control/main.html" which is a path name of the scanner function page.

Further, the ROM 32 stores:

a name of the first MFP 30 (e.g., TOM'S MFP) which is assigned by an administrator thereof;

an IP address (e.g., 10.134.43.28) assigned to the first MFP 30; and a device name (xxxx yyy1: xxxx represents make name; and yyy1 represents device type) of the first MFP 30.

The second MFP 40 has the printer function and the scanner function. The second MFP 40 includes a CPU 41 that controls the entire operation of the second MFP 40, a ROM 42 storing programs to be executed by the CPU 41, a RAM 43 temporarily storing operation results of the CPU 41 and the like. The second MFP 40 further includes a communication device 44 through which the MFP 40 is connected to the network 10, an input panel interfacing the user input, and a display 46.

Similar to the first MFP 30, the second MFP 40 is implemented with application software for controlling the second MFP 40 to operate as a web server. By the web server function, the second MFP 40 receives the HTTP request command transmitted through the network 10 (e.g., by the PC 20M), retrieves the web page, which is stored in the ROM 42 and identified by the path name contained in the HTTP request command, and delivers the retrieved web page to the sender (e.g., the PC 20M) of the HTTP request command. Optionally or alternatively, web pages may be dynamically created by the web sever function. That is, the second MFP may create a web page upon request and/or when the web server application is launched. The thus created web page(s) may be temporarily stored in the RAM 43 and referred to as the web page stored in the ROM 42 as is described above. The second MFP 40 is capable of delivering a web page including a printer function page with which the setting related to the printer function is performed, a scanner function page with which setting related to the scanner function and controlling of the scanner function are performed through the network 10, and a top page in which the hyperlinks to the above web pages are indicated. The web pages the second MFP 40 can deliver are stored in the ROM 42.

Further, the second MFP 40 is installed with application software for controlling the second MFP 40 to operate as an SNMP agent. With the SNMP agent function, the second MFP 40 is capable of receiving the SNMP request command transmitted through the network 10, retrieving requested parameters from the MIB stored in the ROM 42 upon receipt of the SNMP request command, and transmitting an SNMP response command including the retrieved parameters. Objects constituting the MIB are indicated below (see FIG. 4A). It should be noted that various objects other than the below listed are included in the MIB. However, since they are not necessary for describing the present invention, description thereof are omitted for the sake of simplicity.

(a) printerControlUrl: an object in which a URL of the printer function page is set. "1.3.6.1.4.1.2435.2.3.9.4.9.9.2" is assigned as an OID. A URL of the printer function page is "http://10.134.43.87:5431/printer/control/main.html".

(b) scannerControlUrl: an object in which a URL of the scanner function is set. "1.3.6.1.4.1.2435.2.3.9.4.9.9.1" is assigned as an OID. A URL of the scanner page is "http://10.134.43.87:5431/scanner/control/main.html".

(c) sysName: an object in which a name of the second MFP 40 is set. "1.3.6.1.2.1.1.5.0" is assigned as an OID. The name of the second MFP 40 is "Bill's MFP". The name is arbitrarily determined by the administrator of the second MFP 40.

(d) hfDeviceDescr: an object in which the type name of the second MFP 40 is set. "1.3.6.1.2.1.25.3.2.1.3.1" is assigned as an OID. The type name of the MFP 40 is "xxxx yyy2" (xxxx being a make name; and yyy2 is a type name".

(e) ipAddress: an object in which the IP address assigned to the second MFP 40 is set. "1.3.6.1.4.1.2435.2.3.1.4.2.1" is assigned as an OID. The IP address is "10.134.43.87".

The scanner 50 includes a CPU 51 for controlling an entire operation of the scanner 50, a ROM 52 storing programs to be executed by the CPU 51, a RAM 53 temporarily storing results of operation by the CPU 51 and the like. The scanner 50 further includes a communication device 54 through which the scanner 50 is connected to the network 10, and an input panel 55 interfacing a user input.

Similarly to the first MFP 30 and the second MFP 40, the scanner 50 is installed with application software for controlling the scanner 50 to operate as a web server. By the web server function, the scanner 50 receives the HTTP request command transmitted through the network 10 (e.g., by the PC 20M), retrieves the web page, which is stored in the ROM 52 and identified by the path name contained in the HTTP request command, and delivers the retrieved web page to the sender (e.g., the PC 20M) of the HTTP request command. Optionally or alternatively, web pages may be dynamically created by the web sever function. That is, the second MFP may create a web page upon request and/or when the web server application is launched. The thus created web page(s) may be temporarily stored in the RAM 53 and referred to as the web page stored in the ROM 22 as is described above. Web pages the scanner 50 is capable of delivering include a scanner function page, with which setting related to the scanner function and control of the same are performed through the network 10, and a top page, in which a hyperlink to the scanner function page is indicated. The web pages are stored in the ROM 52.

Further, similarly to the second MFP 40, the scanner 50 is installed with application software for controlling the scanner 50 as the SNMP agent, and the MIB is stored in the ROM 52. Objects constituting the MIB are listed below. It should be noted that many other objects are included in the MIB, however, they are not necessary for explaining the present invention. therefore it is not described herein for the sake of simplicity.

(a) scannerControlURl: an object in which a URL of the scanner function page is set. As an ODI, "1.3.6.1.4.1.2435.2.3.9.4.9.9.1" is assigned. A URL of the scanner function page is "http://10.134.32.16:5431/scanner/control/main.html".

(b) sysName: an object in which a name of the scanner 50 is set. As an OID, "1.3.6.1.2.1.1.5.0" is assigned. The name of the scanner 50 is "TOM's scanner". The name of the scanner is arbitrarily determined by the administrator of the second MFP 40.

(c) hrDeviceDescr: an object in which the type name of the scanner 50 is set. As an OID, "1.3.6.1.2.1.25.3.2.1.3.1" is assigned. The type name of the scanner 50 is "xxxx yyy3" (xxxx being make name; yyy3 being type name).

(d) ipAddress: an object in which an IP address assigned to the scanner 50 is set. As an OID, "1.3.36.1.4.1.2435.2.3.1.4.2.1" is assigned. The IP address is "10.134.32.16".

Web Page Delivering Procedure

Figure 5:
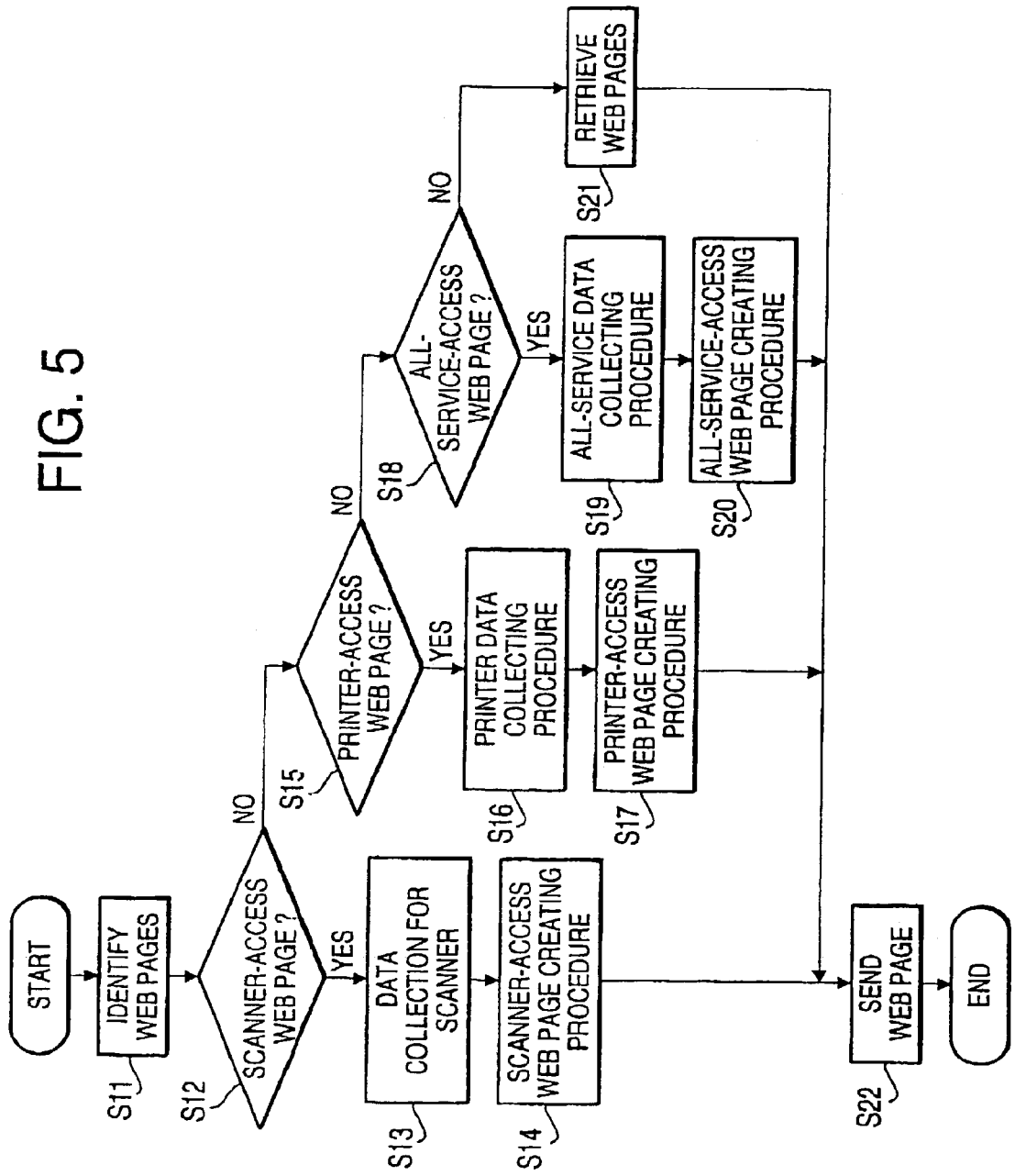
FIG. 5 is a flowchart illustrating a WEB PAGE DELIVERING PROCEDURE.

With reference to FIG. 5, the WEB PAGE DELIVERING PROCEDURE executed by the CPU 31 of the first MFP 30 will be described. The WEB PAGE DELIVERING PROCEDURE is initiated when the first MFP 30 receives the HTTP request command transmitted from the PC 20.

Firstly, the CPU 31 identifies the web page requested by the HTTP request command (S11). In this procedure, based on the path name of the web page included in the HTTP request command, the web page requested by the HTTP request is identified.

If the identified web page is a web page for the scanner (i.e., A SCANNER-ACCESS WEB PAGE) (S12: YES), the CPU 31 executes a SCANNER DATA COLLECTING PROCEDURE (S13). In this procedure, for the devices capable of delivering scanner function pages (i.e., the second MFP 40 and the scanner 50 in this embodiment) from among all the devices connected with the network 10, the CPU 31 collects the name of the device, data including the IP address of the device, the type name of the device and the URL of the scanner function page, and creates a parameter table (e.g., FIG. 6A) in which parameters are arranged in a predetermined order. The detailed description of the procedure will be provided later.

Next, the CPU 31 executed a SCANNER-ACCESS WEB PAGE CREATING PROCEDURE (S14). In this procedure, the CPU 31 creates a web page in which the name of the device, the IP address of the device and the type name of the device are indicated for each data arranged in the parameter table, based on the parameter table created in the SCANNER DATA COLLECTING PROCEDURE in S13. Among the items indicated in the web page, the device name is related to the URL of the scanner function page which is included in the parameter table. Thus, the device name is a hyperlink to the scanner function page.

If the web page identified in S11 is a printer access web page (S12: NO; S15: YES), the CPU 31 executes the PRINTER DATA COLLECTING PROCEDURE (S16). In this procedure, from the devices capable of delivering the printer function pages (the second MFP 40 in this embodiment), data including the device name, the IP address of the device, the device type name, and the URL of the printer function pages is collected, and a parameter table (e.g., FIG. 6B) is created. The procedure will be described in detail later.

In S17, the CPU 31 executes a PRINTER-ACCESS WEB PAGE CREATING PROCEDURE (S17). In this procedure, the CPU 31 creates a web page indicating, for each device, the device name, the IP address of the device and the device type name, based on the parameter table created in S16. Among the items indicated in the printer-access web page, the device names are related to the URLs of the printer function pages in the parameter table, and thus, the device names are hyperlinks to the printer function pages.

If the web page identified in S11 is the access web page for all the services (S12: NO; S15:NO; S18: YES), the CPU 31 executes an ALL-SERVICE-ACCESS DATA COLLECTION PROCEDURE (S19). In this procedure, from the devices capable of delivering the scanner function pages and/or printer function pages (the second MFP 40 and the scanner 50 in this embodiment), that are connected to the network 10, data including the device names, IP addresses of the devices, the device type names and URLs of the web pages (the scanner function pages and/or the printer function pages) is collected, and a parameter table (e.g., FIG. 6C) is created. The procedure will be described in detail later.

Next, the CPU 31 executes the ALL-SERVICE-ACCESS WEB PAGE CREATING PROCEDURE (S20). In this procedure, the CPU 31 creates a web page indicating the device names, device IP addresses, device type names are indicated for each piece of data indicated in the parameter table. Among the items indicated in the all-service-access web page, the device names are related to the URLs of the web pages (scanner function pages and/or printer function pages). Thus, the device names are hyperlinks to the web pages for all the services available.

If the web page identified in S11 is not the access web page (S12: NO; S15:NO; S18:NO), the CPU 31 retrieves the web page identified by the HTTP request command from the ROM 32 (S21). In this procedure, the printer function page, the scanner function page, the device search page or the top page is retrieved.

As above, after the step S14, S17, S20 or S21 is executed, the CPU 31 delivers a wave page (S22). In this procedure, if the procedure in S14 has been finished, the access web page of the scanner is transmitted to the PC 20. If S17 has been finished, the printer-access web page is delivered to the PC 20. If S20 has been finished, the all-service-access web page is delivered to the PC 20. If S21 has been finished, the web page retrieved in S21 is transmitted to the PC 20.

Figure 7A:
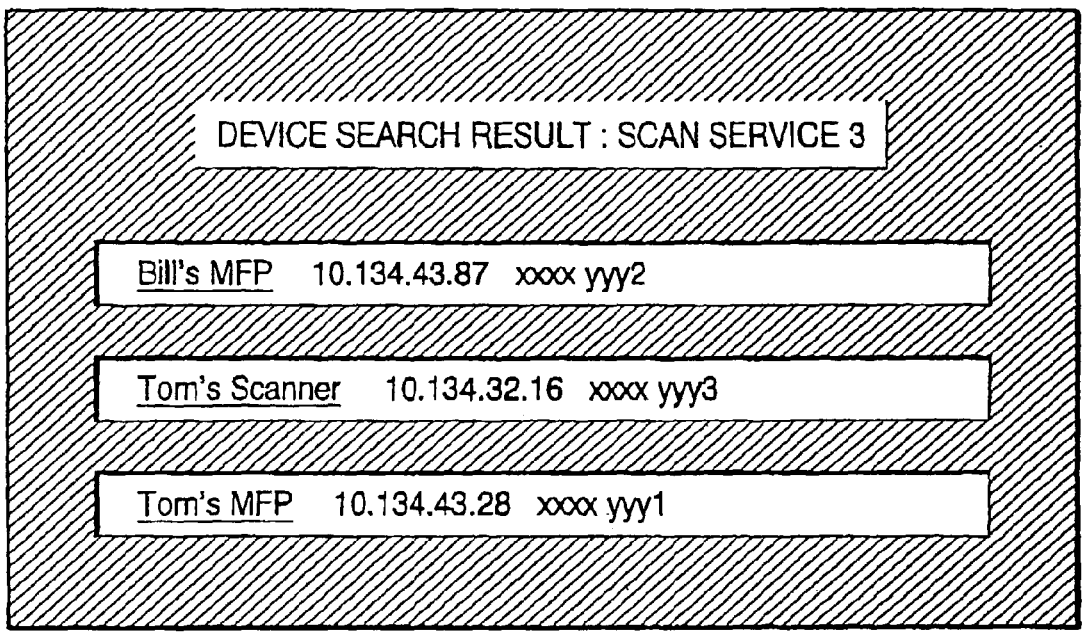
FIG. 7A is an access page for scanners displayed on a display screen of the personal computer.
Figure 7B:
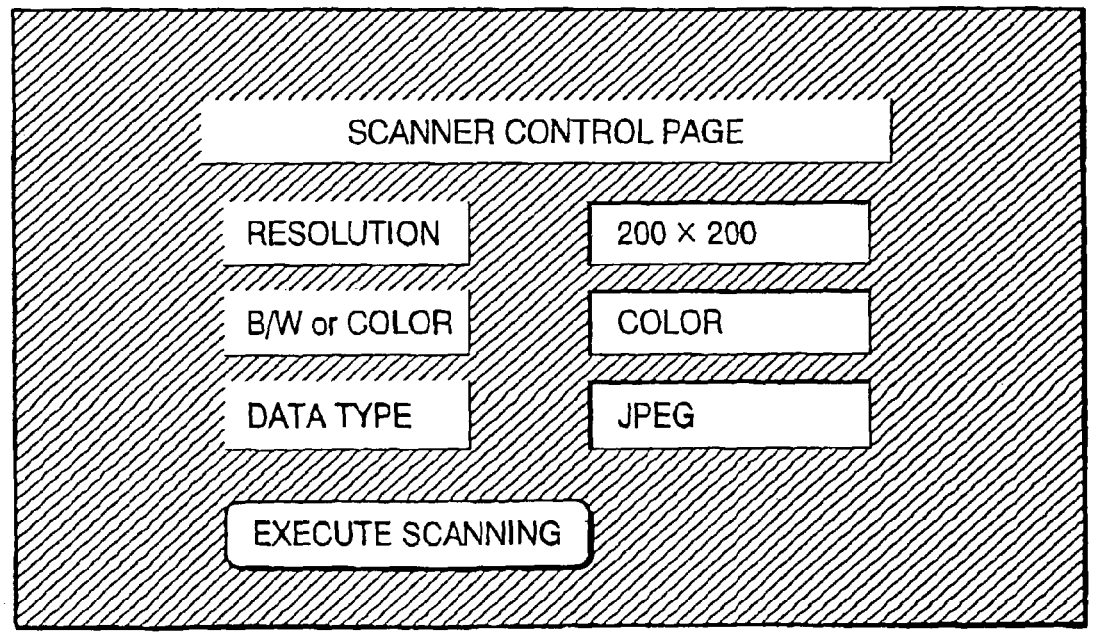
FIG. 7B is an access page for scanner function.

Each PC 20 receives the web pages delivered as described above, and displays the delivered web pages on the display 26. An example of the scanner-access web page is shown in FIG. 7A. In this example, the names of the second MFP 40, the scanner 50 and the first MFP 30, and corresponding IP addresses and type names are indicated in the wave page. As described above, the names of the devices are the hyperlinks to the corresponding scanner function pages which are delivered by the corresponding devices. In this case, if an operation to select "TOM's scanner" is input through the operation unit 25 (for example, a mouse pointer is positioned on the "TOM's scanner" and a mouse button is clicked), the scanner 50 delivers the scanner function page, which is displayed on the display 26 of the PC 20, as shown in FIG. 7B.

Then, via the scanner function page (see FIG. 7B) displayed on the display 26, the user can remotely modify the settings of the resolution of the scanner 50, image color (black & white/color), data type and the like. Further, through the operation unit 25, by selecting an "EXECUTE SCANNING" button shown in the lower portion in FIG. 7B, photographs and/or originals placed on the scanner 50 can be scanned in accordance with the settings remotely entered as described above.

Scanner Data Collecting Procedure

Next, the scanner data collecting procedure executed by the CPU 31 of the first MFP 30 will be described with reference to FIG. 8. The data collecting procedure is called in S13 of FIG. 5.

In S31, the CPU 31 creates an SNMP request packet. In this procedure, the SNMP request packet requesting for the device name, IP address of the device, the device type name, and URL of the scanner function page is created. Specifically, from among the objects constituting the MIB, parameters set to sysName, ipAddress, hrDeviceDescr and scannerControlUrl are requested by the SNMP request packet.

Next, the CPU 31 broadcasts the SNMP request packet (S32). In this procedure, the SNMP request packet created in S31 is transmitted to all the devices connected to the network 10. The devices which receive the SNMP request packet, reply thereto by sending data constituting parameters which are set to sysName, ipAddress, hrDeviceDesc, scannerControlUrl and the like. These parameters are returned by the devices as an SNMP reply packet. It should be noted that the devices which return the SNMP reply packet are, according to the embodiment, the second MFP 40 and the scanner 50.

Next, the CPU 31 starts a timer (S33).

In S34, the CPU 31 judges whether the SNMP reply packet(s) is received. If the SNMP reply packet is received (S34: YES), control proceeds to S35, where the CPU 31 adds the parameters constituting the SNMP reply packet to the parameter table. When the procedure shown in FIG. 8 is executed first time after it is initiated, the CPU 31 creates, in the RAM 33, the parameter table as shown in FIG. 6A, in which the device name, the IP address of the device, the device type name, and the URL of the scanner function page are to be input. Then, to the parameter table, the parameters constituting the SNMP reply packet are added. Thus, upon every execution of step S35, parameters are added to the parameter table.

After the procedure in S35 is executed, or it is judged that the SNMP reply packet is not received (S34: NO), the CPU 31 judges whether a predetermined period of time set to the timer (in S33) has passed (S36). If the predetermined period has not elapsed (S36: NO), control returns to S34.

If the predetermined time has elapsed (S36: YES), the CPU 31 checks the function ID in the function table (S37). In the procedure of S37, if it is judged that the function ID "scanner" is found in the function table (S37: YES), the CPU 31 adds the parameters included in the function table and the device table into the parameter table (S38). Specifically, the CPU 31 adds the path name of the scanner function page related to the function ID of "scanner" in the function table, and the device name, IP address of the device and the device type name in the device table to the parameter table that is created in S35. It should be noted that the path name of the scanner function page is added to the parameter table as the URL of the scanner function page.

Alternatively, the URL (http://10.134.43.28/scanner/control/main.html) of the scanner function table may be generated based on the IP address (10.134.43.28) of the first MFP 30 and the path name (/scanner/control/main.html) of the scanner function page, and may be added to the parameter table.

After the procedure in S38 is executed, or it is judged that the function ID "scanner" is not included in the function table (S37: NO), the procedure shown in FIG. 8 is terminated.

Printer Data Collecting Procedure

Next, the PRINTER DATA COLLECTING PROCEDURE which is executed by the CPU 31 of the first MFP 30 will be described. The PRINTER DATA COLLECTING PROCEDURE is called in S16 of FIG. 5. Since the PRINTER DATA COLLECTING PROCEDURE is similar to the SCANNER DATA COLLECTING PROCEDURE shown in FIG. 8, only differences with respect to the SCANNER DATA COLLECTING PROCEDURE will be described.

Firstly, the CPU 31 creates an SNMP request packet (S31). The SNMP request packet requests for the device name, the IP address of the device, the device type name and the URL of the printer function page. Specifically, in this procedure, the SNMP request packet requesting for the parameters set to the objects of sysName, ipAddress, hrDevice Descr, and printerControlUrl is created.

Then, the CPU 31 broadcasts the SNMP request packet (S32). Upon receipt of the SNMP request packet, if each device has all the parameters, in the MIB, set to the sysName, ipAddress, hrDeviceDescr and printerControlUrl, the device transmits the data constituted by the parameters as the SNMP reply packet to the first MFP 30. In the embodiment, the device which transmits the SNMP replay packet is the second MFP 40.

Next, the CPU 31 starts a timer (S33).

Then, the CPU 31 judges whether the SNMP reply packet is received (S34). If the SNMP replay packet is received (S34: YES), the CPU 31 adds the parameters constituting the SNMP reply packet into the parameter table (S35). When the procedure of S35 is executed first time since the procedure was started, the CPU 31 creates, in the RAM 33, the parameter table as shown in FIG. 6B including the device name, IP address of the device, the device type name, and the URL of the printer function page. Then parameters constituting the SNMP reply packet are added into the parameter table. Thereafter, upon every execution of S35, parameters are added to the parameter table.

After the procedure of S35 is executed, or it is judged that the SNMP reply packet is not received (S34: NO), the CPU 31 judges whether the predetermined period (e.g., 5 sec.) has elapsed (S36). If the predetermined period has not yet elapsed (S36: NO), control returns to S34.

If the predetermined period has elapsed (S36: YES), the CPU 31 checks the function ID in the function table (S37). In S37, if there is a function ID "printer" in the function table (S37: YES), the CPU 31 adds the parameters included in the function table and device table into the parameter table (S38). Specifically, in this procedure, the CPU 31 adds the path name of the printer function page, device name in the device table, the IP address and the device type name of the device into the parameter table created in S35.

Alternatively, the URL (http://10.134.43.28/printer/control/main.html) of the printer function page may be generated based on the IP address (10.134.43.28) of the first MFP 30 and the path name (/scanner/printer/main.html) of the printer function page, and the thus generated URL may be added in the parameter table.

After the procedure in S38 is executed, or it is judged that the function ID "printer" is not present in the function table (S37: NO), the PRINTER DATA COLLECTING PROCEDURE is terminated.

All-Service Data Collecting Procedure

Next, the ALL-SERVICE DATA COLLECTING PROCEDURE executed by the CPU 31 will be described with reference to FIG. 9, which is called in S19 of the flowchart shown in FIG. 5.

In S51, the CPU 31 creates the SNMP request packet. In this procedure, as in S31 of FIG. 8, a first SNMP request packet requesting for the device name, the IP address of the device, the device type name and the URL of the scanner function page is created. Further, a second SNMP request packet requesting for the device name, the IP address of the device, the device type name and the URL of the printer function page is created.

Then, the CPU 31 broadcasts the first and second SNMP request packets (S52). That is, the first and second SNMP request packets are transmitted to all the devices connected with the network 10.

Upon receipt of the first SNMP request packet, if each device has all the parameters, in the MIB, set to the sysName, ipAddress, hrDeviceDescr and scannerControlUrl, the device transmits the data constituted by the parameters to the first MFP 30 as the SNMP reply packet. In the embodiment, the devices which transmit the SNMP replay packet are the second MFP 40 and the scanner 50.

Upon receipt of the second SNMP request packet, if each device has all the parameters, in the MIB, set to the sysName, ipAddress, hrDeviceDescr and printerControlUrl, the device transmits the data constituted by the parameters to the first MFP 30 as the SNMP reply packet. In the embodiment, the device which transmits the SNMP replay packet is the second MFP 40.

Next, the CPU 31 starts a timer (S53).

Then, the CPU 31 judges whether the SNMP reply packet(s) is received (S54). If the SNMP replay packet is received (S54: YES), the CPU 31 adds the parameters constituting the SNMP reply packet into the parameter table (S55). When the procedure of S55 is executed first time since the procedure was started, the CPU 31 created, in the RAM 33, the parameter table as shown in FIG. 6C including the device name, IP address of the device, the device type name, and the URL of the web page (i.e., the printer function page or the scanner function page). Then parameters constituting the SNMP reply packet are added into the parameter table. Thereafter, upon every execution of S55, parameters are added into the parameter table.

After the procedure of S55 is executed, or it is judged that the SNMP reply packet is not received (S54: NO), the CPU 31 judges whether the predetermined period (5 sec.) has elapsed (S56). If the predetermined period has not yet elapsed (S56: NO), control returns to S54.

If the predetermined period has elapsed (S56: YES), the CPU 31 adds the parameters included in the function table and the device table into the parameter table (S58). Specifically, in this procedure, the CPU 31 adds the path name of the scanner function page related to the function ID of "scanner", device name in the device table, the IP address and the device type name of the device in the function table into the parameter table created in S53. Further, the CPU 31 adds the path name of the printer function page related to the function ID of "printer", device name in the device table, the IP address and the device type name of the device in the function table into the parameter table created in S53.

Figure 9:
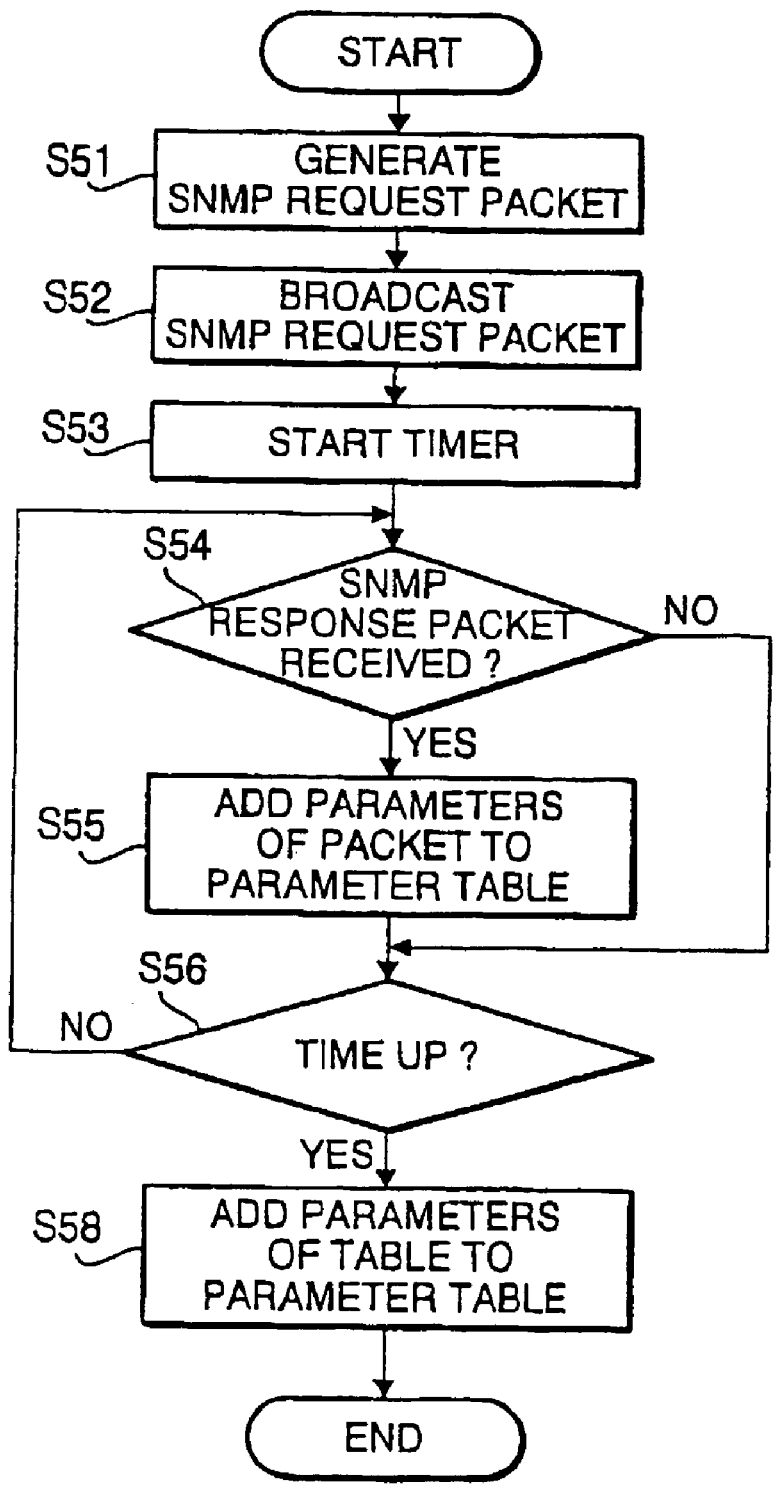
FIG. 9 is a flowchart illustrating a data collecting procedure for all the services available.

After the procedure in S58 is finished, the procedure shown in FIG. 9 is terminated.

According to the network system 1 configured as described above, by the procedure in S14, S17 or S20, an access web page in which the hyperlink to the scanner function page and/or printer function page is created. When the hyperlink on the access web page is used, the scanner function page or the printer function page can be directly accessed. Therefore, it becomes unnecessary to sequentially follow a chain of pages intervening between the top page and the scanner function page or the printer function page. It should be noted that, according to the embodiment, the first MFP 30 has the web server function, and in response to the HTTP request output by the PC 20, the web page is transmitted from the MFP 30 to the PC 20. With this configuration, although the MFP 30 is unable to display the web page created therein, in association with the PC 20 through the network 10, a user is capable of control the MFP 30 to create a necessary web page, and have the web page display on a display 26 of the PC 20. In particular, since the first MFP 30 has the function of creating the access web pages, the user can control the first MFP 30 to collect necessary data and view the access web page including hyperlinks to the user-intended function-categorized web pages.

Optionally, the PC 20 may include the function of creating the access web pages as the MFP 20.

Further, according to the embodiment, each of the second MFP 40 and the scanner 50 has the web server function, and in response to the HTTP request output by the PC 20M, the web page is transmitted from the MFP 40 or the scanner 50 to the PC 20M. With this configuration, although the MFP 40 or the scanner 50 is unable to display the web page stored therein, in association with the PC 20M through the network 10, a user is capable of viewing the web page on the display 26 of the PC 20M.

It should also be noted that the PC 20 and PC 20M are provided for the first MFP 30, and the second MFP 40 and the scanner 50. The invention is not limited to such a configuration, and can be modified such that the PC 20 is capable of transmitting the HTTM request commands to the MFP 40 or the scanner 50, and the PC 20M is capable of transmitting the HTTM request commands to the MFP 30. Further, more than two PCs may be provided in the network system 1.

Further, according to the embodiment, the parameter table including the path names or URLs of web pages corresponding to the items selected by the user in S13, S16 and S19 of FIG. 5 is created. Then, based on the thus created parameter table, the access page can be created. Therefore, the thus created access web page does not include hyperlinks corresponding to functions which have not been selected by the user. Accordingly, whichever hyperlink may be used, the user may not access to devices that do not have the function the user intends to use.

As above, according to the network system 1, it becomes possible to create, relatively easily, an access page through which a web page corresponding to the function the user intends to use, or the device having the function the user intends to use can be accessed relatively easily.

In S22 of FIG. 5, the first MFP 30 delivers an access web page to the PC 20, with which the operation to select the items of the device searching page was performed. Therefore, as far as a device allows an input operation of a user and is capable of displaying a web page, it is possible to access a web page corresponding to the function the user intends to use (i.e., the scanner function page or the printer function page) or devices having the function the user intends to use, even if the device is not the PC 20. For example, when an another PC other than PCs 20 capable of inputting operation commands, and displaying a web page is connected to the network system 10, it becomes possible to access a web page corresponding to the function the user intends to use or devices having the function the user intends to use from the newly connected PC.

It should be noted that the present invention is not limited to the configuration described above, and can be modified in various ways.

For example, according to the embodiment, in the WEB PAGE DELIVERING PROCEDURE shown in FIG. 5, the first MFP 30 creates an access web page and delivers the same in response to the request transmitted from the PC 20. This may be modified such that the first MFP 30 displays the device searching page on the display 36, and the selection of the items on the device searching page is performed through the input panel 35 of the first MFP 30. With this modification, the access web page can be displayed on the display device 36, and therefore, without using another device, it is possible to access a web page corresponding to the function user intends to use (i.e., the scanner function page or the printer function page) or devices having the function the user intends to use.

Figure 8:
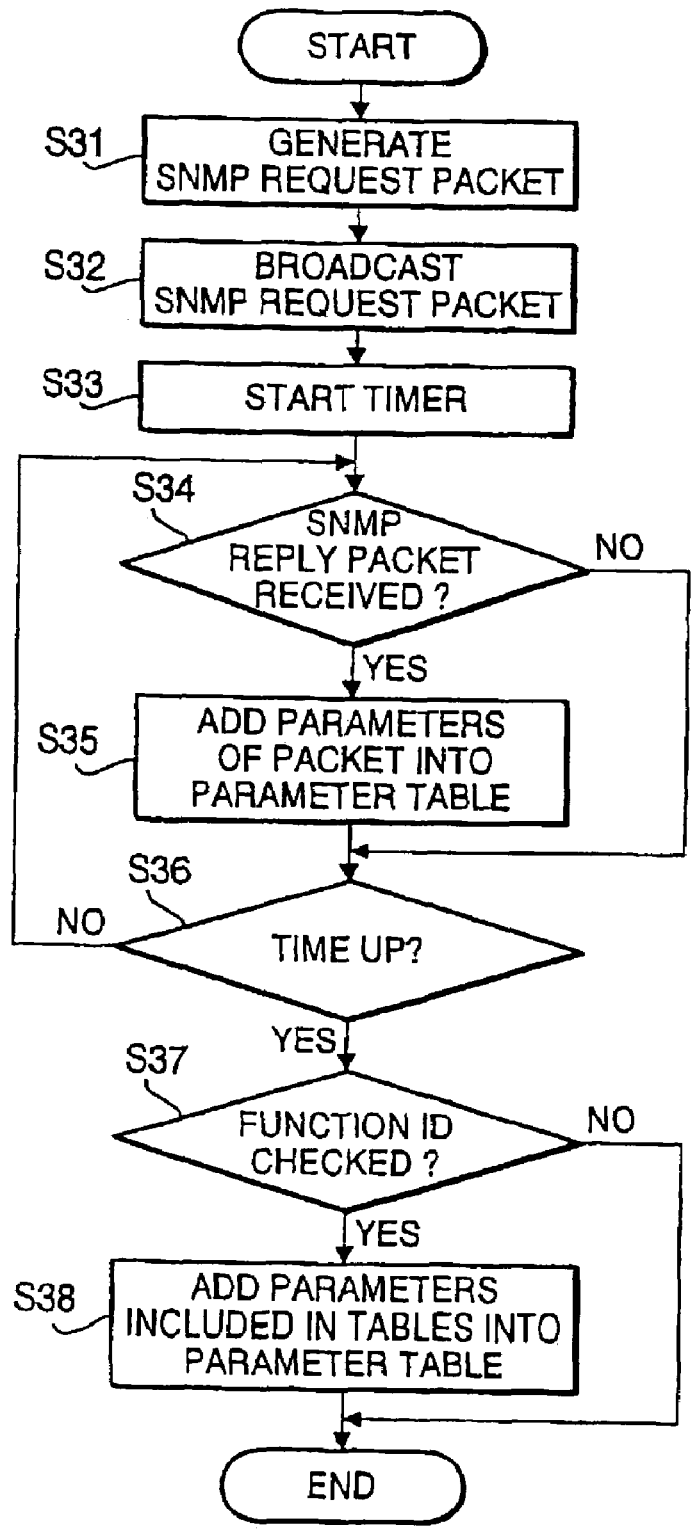
FIG. 8 is a flowchart illustrating a data collecting procedure for the scanner of the printer.

According to the embodiment, in FIG. 8, the SNMP request packet to request for the parameters necessary for creating the access web page is created in S31, and is broadcast in S32, and then, the parameter table is created (S35) based on all the SNMP reply packets transmitted in response to the SNMP request packet. This procedure may be modified as follows.

Firstly, in S31, the first and second SNMP request packets are created as in S51 of FIG. 5. Then, in S32, the first and second SNMP request packets are broadcast.

Then, in S35, from the SNMP reply packets as received, ones including the parameters necessary for creating the access web page are extracted, and the access web page is created based on the extracted SNMP reply packets. In this case, the SNMP reply packets are extracted such that, for example, the SNMP reply packets having parameters in which the URL of the web page includes "scanner" are extracted when the access web page for the scanner. According to this example, the parameters constituting the extracted SNMP reply packets do not have URLs of web pages other than the scanner function pages. Therefore, the created access web page based on the extracted SNMP reply packets, hyperlinks to web pages other than the scanner function pages will not be included. Therefore, whichever hyperlink is used, it is ensured the device having the function the user intends can be accessed.

In the above-described embodiment, in S32 of FIG. 8, and in S52 of FIG. 9, the SNMP request packet is broadcast. However, the invention is not limited to this configuration. For example, if the devices connected to the network 10 are divided into a plurality of groups, the SNMP request may be multicast to devices included in one or more predetermined ones of the plurality of groups.

In the above-described embodiment, each device is configured to deliver the printer function web page or the scanner function web page as the web page corresponding to the function itself. The invention need not be limited to such a configuration. By preparing data (i.e., table and MIB) related to a function other than the printer or scanner function, the web page related to the prepared function can be delivered. For example, a web page for browsing functional settings of the device may be provided.

In the above-described embodiment, the first MFP 30 collects the parameters necessary for creating the access web page using the SNMP. However, the protocol employed for collecting the parameters need not be limited to the SNMP, and any other protocol may be usable.

In the above-described embodiment, the web page, data table and MIB are stored in the ROMs 32, 42, and 52. The invention is not limited to such a configuration. For example, if each device is provided with a recording device, e.g., a hard disk drive, the data may be stored in the hard disk drive. With this configuration, the data (i.e., the web page, data table and MIB) can easily be changed.

The embodiment described above may be modified such that the first MFP 30 is implemented with an SNMP agent, and the MIB is stored in the ROM 32. In such a configuration, as in the second MFP 40 and the scanner 50, after the SNMP request packet is received through the network 10, the SNMP reply packet is transmitted to another device.

In another modification, the second MFP 40 or the scanner 50 may be installed with application software which controls the second MFP 40 or the scanner 50 to function as the SNMP manager, and the function table and the device table are stored in the ROM 32. In this case, with use of the MFP 40 or scanner 50, the procedure similar to that shown in FIG. 5 can be executed.

In the above-described embodiment, only the printer function and scanner function are indicated as functions usable through the network system 1. The invention is not limited to this configuration, and it can be readily considered that various functions such as a facsimile function, a copier function and the like can also be included as the functions usable through the network system 1.

The device and method according to the above-described embodiment and modification thereof can be realized when appropriate programs provided and executed by personal computers or the like. Such programs may be stored in recording medium such as a flexible disk, CD-ROM, memory cards and the like and distributed. Alternatively or optionally, such programs can be distributed through networks such as the Internet.

The present disclosure relates to the subject matter contained in Japanese Patent Application No. 2001-354593, filed on Nov. 20, 2001, which is expressly incorporated herein by reference in its entirety.

What is claimed is:

1. A network system including a plurality of network devices interconnected with each other through a network, the plurality of network devices including at least a first network device and a second network device, one or more network devices including at least the first network device having a plurality of functions, wherein said one or more network devices including at least said first network device comprise a function-categorized web page delivering system that delivers function-categorized web pages respectively corresponding to one or more functions, among the plurality of functions, realized by said one or more network devices, the function-categorized web pages being displayed by network devices configured to display the function-categorized web pages, wherein said second network device includes:

a location data collecting system that collects location data necessary for accessing the function-categorized web pages corresponding to one of the functions designated by a user from among said one or more network devices including said first network device;

an access web page creating system that creates hyperlinks to the function-categorized web pages corresponding to the function designated by the user based on the location data collected by said location data collecting system; and a location data requesting system that requests said one or more network devices for location data corresponding to the function designated by the user, wherein said one or more network devices including said first network device comprises a location data transmitting system that transmits the location data of the function-categorized web page, which each of said one or more network devices can deliver, corresponding to the function designated by the user to said second network device in response to a request by said second network device, wherein said location data collecting system receives the location data transmitted by said one or more network devices including said first network device, and wherein said first network device stores a top page from which each of the functions of the first network device can be accessed, the function-categorized web pages respectively correspond to the functions of the first network device, and the location data, which the second network device requests and the first network device transmits, in response to the request by the second network device, is location data indicating a location of the function-categorized page corresponding to the function designated by the user.

2. The network system according to claim 1, wherein said plurality of network devices includes a client device allowing an input operation of a user and being capable of displaying a web page,
wherein said second network device includes:
a function selecting web page delivering system that delivers a function selecting web page to said client device, the function selecting web page allowing the user of said client device to select one or more functions from among the plurality of functions therethrough;
a reply data receiving system that receives reply data transmitted from said client device, the reply data being transmitted by said client to said second network printing device when the user of the client device performs an operation to select the one or more functions with reference to the function selecting web page delivered by said function selecting web page delivering system;
a designated function identifying system that identifies the designated function, which is designated by the user, in accordance with the reply data received by said reply data receiving system; and
an access web page delivering system that transmits an access web page to said client device when said location data collecting system and said access web creating system create the access web page based on the designated function identified by said designated function identifying system.

3. The network system according to claim 1, wherein said second network device includes an access web page displaying system that displays an access web page created by said access web page creating system.

4. The network system according to claim 1, wherein said function includes a printer function.

5. The network system according to claim 1, wherein said function includes an image scanner function.

6. A network system including a plurality of network devices interconnected with each other through a network, the plurality of network devices including at least a first network device and a second network device, one or more network devices including at least the first network device having a plurality of functions,
wherein said one or more network devices including at least said first network device comprise a function-categorized web page delivering system that delivers function-categorized web pages respectively corresponding to one or more functions, among the plurality of functions, realized by said one or more network devices, the function-categorized web pages being displayed by network devices configured to display the function-categorized web pages,
wherein said second network device includes:
a location data collecting system that collects location data necessary for accessing the function-categorized web pages corresponding to one of the functions designated by a user from among said one or more network devices including said first network device;
an access web page creating system that creates hyperlinks to the function-categorized web pages corresponding to the function designated by the user based on the location data collected by said location data collecting system; and
a location data requesting system that request said one or more network devices for location data of all the function-categorized web pages which can be delivered by said one or more network devices;
wherein said one or more network devices including said first network device comprises a location data transmitting system that transmits the location data of the function-categorized web pages, which each of said one or more network devices can deliver, to said second network device in response to a request by said second network device, and
wherein said location data collecting system receives the location data transmitted by at least said one or more network devices including said first network device, said location data collecting system extracting only the location data of the function-categorized web page corresponding to a function designated by a user, and
wherein said first network device stores a top page from which each of the functions of the first network device can be accessed, the function-categorized web pages respectively correspond to the functions of the first network device, and the location data, which the second network device requests and the first network device transmits, in response to the request by the second network device, is location data indicating a location of the function-categorized page corresponding to the function designated by the user.

7. The network system according to claim 6, wherein said second network device includes an access web page displaying system that displays an access web page created by said access web page creating system.

8. The network system according to claim 6, wherein said function includes a printer function.

9. The network system according to claim 6, wherein said function includes an image scanner function.

10. A method of creating a web page for a network system including a plurality of network devices interconnected with each other through a network, the plurality of network printing devices including at least a first network printing device and a second network printing device, one or more network printing devices including at least the first network printing device having a plurality of functions,
wherein the one or more network printing devices including at least the first network printing device comprise a function-categorized web page delivering system that delivers function-categorized web pages respectively corresponding to one or more functions, among the plurality of functions, realized by the one or more network printing devices, the function-categorized web pages being displayed by network devices configured to display the function-categorized web pages,
wherein the second network printing device executes a method that includes:
requesting the one or more network printing devices for location data of a function-categorized web page corresponding to a function designated by a user;
receiving the location data that is transmitted from the one or more network printing devices including the first network printing device in reply to the requesting;

creating an access web page including hyperlinks to the function-categorized web pages corresponding to the function designated by the user based on the location data received, wherein said first network printing device stores a top page from which each of the functions of the first network printing device can be accessed, the function-categorized web pages respectively correspond to the functions of the first network printing device, and the location data, which the second network printing device requests and the first network printing device transmits, in response to the request by the second network printing device, is location data indicating a location of the function-categorized page corresponding to the function designated by the user.

11. A method of creating a web page for a network system including a plurality of network printing devices interconnected with each other through a network, the plurality of network printing devices including at least a first network printing device and a second network printing device, one or more network printing devices including at least the first network printing device having a plurality of functions, wherein the one or more network printing devices including at least the first network printing device comprise a function-categorized web page delivering system that delivers function-categorized web pages respectively corresponding to one or more functions, among the plurality of functions, realized by the one or more network devices, the function-categorized web pages being displayed by network printing devices configured to display the function-categorized web pages, wherein the second network printing device executes a method that includes:

requesting the one or more network printing devices for location data of all the function-categorized web pages which can be delivered by the one or more network printing devices;

receiving the location data that is transmitted from the one or more network printing devices including the first network printing device in reply to the requesting;

extracting only the location data of the function-categorized web page corresponding to a function designated by a user; and creating an access web page including hyperlinks to the function-categorized web pages corresponding to the function designated by the user based on the location data extracted, wherein said first network printing device stores a top page from which each of the functions of the first network printing device can be accessed, the function-categorized web pages respectively correspond to the functions of the first network printing device, and the location data, which the second network printing device requests and the first network printing device transmits, in response to the request by the second network printing device, is location data indicating a location of the function-categorized page corresponding to the function designated by the user.

12. A method of transmitting data in a network system including a plurality of network devices interconnected with each other through a network, the plurality of network devices including at least a first network device and a second network device, one or more network devices including at least the first network device having a plurality of functions, wherein the one or more network devices including at least the first network device comprise a function-categorized web page delivering system that delivers function-categorized web pages respectively corresponding to one or more functions, among the plurality of functions, realized by the one or more network devices, the function-categorized web pages being displayed by network devices configured to display the function-categorized web pages, wherein the second network device includes:

a location data requesting system that request the one or more network devices for location data corresponding to the function designated by the user;

a location data collecting system that collects location data necessary for accessing the function-categorized web pages corresponding to one of the functions designated by a user from among the one or more network devices including the first network device; and an access web page creating system that creates hyperlinks to the function-categorized web pages corresponding to the function designated by the user based on the location data collected by the location data collecting system, wherein at least one of the one or more network devices including the first network device executes the method which includes:

transmitting the location data of the function-categorized web page corresponding to the function designated by the user to the second network device in response to a request by the second network device, storing a top page, in said first network device, from which each of the functions of the first network device can be accessed;

corresponding the function-categorized web pages respectively to the functions of the first network device; and transmitting the location data, which the second network device requests, from the first network device transmits, in response to the request by the second network device, wherein the location data indicates a location of the function-categorized page corresponding to the function designated by the user.

13. A network system including a plurality of network printing devices interconnected with each other through a network, the plurality of network printing devices including at least a first network printing device and a second network device, the first network printing device having one or more functions, wherein each of said first network printing devices comprises:

a function-categorized web page delivering system that delivers function-categorized web pages respectively corresponding to the one or more functions, said first network printing device storing location data indicative of a location of each of the function-categorized web pages, said first network printing device storing a top page from which each of the functions of the first network printing device can be accessed and the function-categorized web pages respectively correspond to the functions of the first network printing device; and a location data transmitting system capable of transmitting the location data of the function-categorized web pages, in accordance with a request for location data by said second network printing device, wherein said second network printing device includes:

a location data requesting system that requests said first network printing devices for location data corresponding to a predetermined function;

a location data collecting system that collects location data from said first network printing devices; and an access web page creating system that creates hyperlinks to the function-categorized web pages corresponding to the function designated through the location data requesting system, wherein said location data collecting system receives the location data transmitted from said first network printing device, and wherein said second network printing device displays the function-categorized web page, and wherein the location data, which the second network printing device requests and the first network printing device transmits, in response to the request by the second network printing device, is location data indicating a location of the function-categorized page corresponding to the function designated by the user.

14. The network system according to claim 13, wherein the second network device includes a peripheral device having a plurality of functions in combination with a predetermined network device connectable to said peripheral device through the network, the predetermined network device having a display device, the function-categorized web page being transmitted from said peripheral device to said predetermined network device and displayed on said display device of said predetermined network device.

15. The network system according to claim 13, wherein said second device has a web page indicating at least one of settings and status of functions thereof, the access web page being included in the web page.

16. The network system according to claim 13, wherein said second device has a function of a printer.

17. A method of creating a web page employed in a network system including a plurality of network printing devices interconnected with each other through a network, the plurality of network printing devices including at least a first network printing device and a second network printing device, one or more network printing devices including at least the first network printing device having a plurality of functions, wherein said first network printing device comprises:

a function-categorized web page delivering system that delivers function-categorized web pages respectively corresponding to one or more functions, among the plurality of functions of said first network printing device, said first network printing device storing location data indicative of a location of each of the function-categorized web pages, said first network printing device storing a top page from which each of the functions of the first network printing device can be accessed and the function-categorized web pages respectively correspond to the functions of the first network printing device; and a location data transmitting system capable of transmitting the location data of one of the function-categorized web pages in accordance with a request for location data to said second network printing device, wherein said second device executes a method, which includes:

requesting the first network printing device for location data corresponding to a predetermined function;

collecting location data from the first network printing device;

creating hyperlinks to the function-categorized web pages corresponding to the function designated with the location data requesting system; and displaying a function-categorized web page which is linked from an access web page, wherein said first network printing device stores a top page from which each of the functions of the first network printing device can be accessed, the function-categorized web pages respectively correspond to the functions of the first network printing device, and the location data, which the second network printing device requests and the first network printing device transmits, in response to the request by the second network printing device, is location data indicating a location of the function-categorized page corresponding to the function designated by the user.

18. The method according to claim 17, wherein the second device includes a peripheral device having a plurality of functions in combination with a predetermined network device connectable to said peripheral device through the network, the predetermined network device having a display device, the function-categorized web page being transmitted from said peripheral device to said predetermined network device and displayed on said display device of said predetermined network device.

19. The method according to claim 17, wherein said second device has a web page indicating at least one of settings and status of functions thereof, the access web page being included in the web page.

* * * * *